United States Patent
Baehrle-Miller

(10) Patent No.: US 11,597,360 B2
(45) Date of Patent: Mar. 7, 2023

(54) METHOD FOR HOLDING A VEHICLE IN THE STATIONARY STATE, OPEN-LOOP AND CLOSED-LOOP CONTROL DEVICE FOR A BRAKE DEVICE OF A VEHICLE AND BRAKE DEVICE OF A VEHICLE

(71) Applicant: Robert Bosch GmbH, Stuttgart (DE)

(72) Inventor: Frank Baehrle-Miller, Schoenaich (DE)

(73) Assignee: Robert Bosch GmbH, Stuttgart (DE)

( * ) Notice: Subject to any disclaimer, the term of this patent is extended or adjusted under 35 U.S.C. 154(b) by 610 days.

(21) Appl. No.: 16/450,100

(22) Filed: Jun. 24, 2019

(65) Prior Publication Data

US 2020/0055493 A1 Feb. 20, 2020

(30) Foreign Application Priority Data

Aug. 17, 2018 (DE) ...................... 10 2018 213 848.6

(51) Int. Cl.
*B60T 7/12* (2006.01)
*B60T 17/18* (2006.01)
*B60T 17/22* (2006.01)

(52) U.S. Cl.
CPC ................. *B60T 7/12* (2013.01); *B60T 17/18* (2013.01); *B60T 17/22* (2013.01); *B60T 2210/20* (2013.01)

(58) Field of Classification Search
CPC . B60T 7/12; B60T 7/122; B60T 17/22; B60T 17/18; B60T 2210/20; B60T 2201/06; B60T 13/745; B60T 8/171
See application file for complete search history.

(56) References Cited

U.S. PATENT DOCUMENTS

| 6,679,810 | B1* | 1/2004 | Boll | B60W 10/04 477/195 |
|---|---|---|---|---|
| 8,938,346 | B2* | 1/2015 | Oliveira | B60T 7/12 701/70 |
| 2008/0086253 | A1* | 4/2008 | Nakayama | B60T 7/122 701/80 |
| 2014/0243152 | A1* | 8/2014 | Gibson | B60T 7/122 477/185 |
| 2015/0344004 | A1* | 12/2015 | Al-Regib | B60W 30/1819 701/51 |
| 2017/0305403 | A1* | 10/2017 | Maron | B60T 7/108 |
| 2018/0022335 | A1* | 1/2018 | Kunz | B60W 40/12 303/20 |
| 2018/0215355 | A1* | 8/2018 | Kinder | B60T 7/122 |

* cited by examiner

*Primary Examiner* — James M McPherson
*Assistant Examiner* — Kyle J Kingsland
(74) *Attorney, Agent, or Firm* — Maginot, Moore & Beck LLP

(57) ABSTRACT

Method for holding a vehicle in the stationary state, which has the following steps: (a) if the vehicle has an automatic transmission, engaging a parking lock, or if the vehicle has a manual transmission, engaging a gear, (b) at least temporarily, automatically carrying out vehicle movement monitoring by means of a sensing device; and (c) automatically activating a brake device of the vehicle in order to apply a braking force if the sensing device signals a vehicle movement.

9 Claims, 4 Drawing Sheets

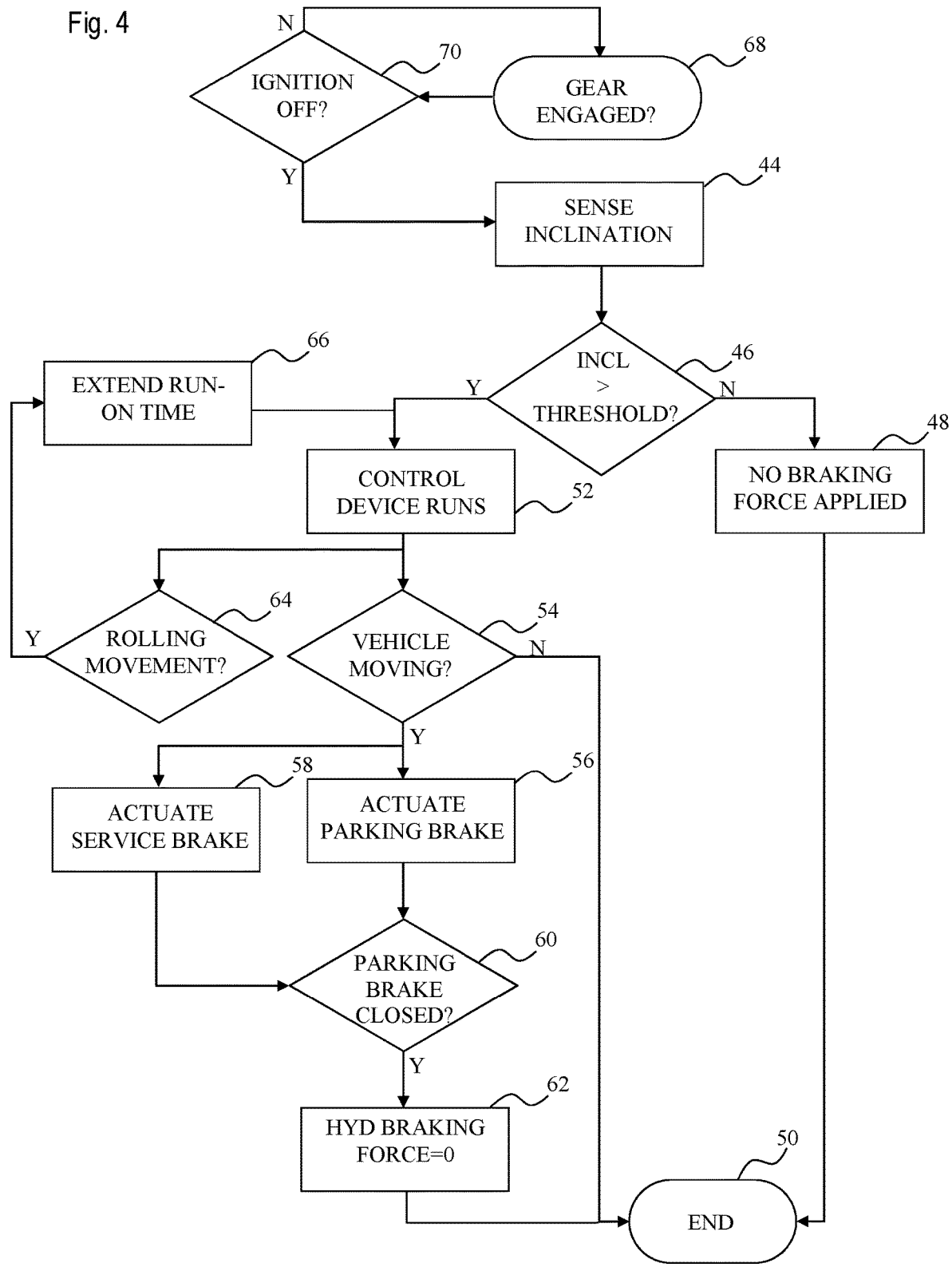

METHOD FOR HOLDING A VEHICLE IN THE STATIONARY STATE, OPEN-LOOP AND CLOSED-LOOP CONTROL DEVICE FOR A BRAKE DEVICE OF A VEHICLE AND BRAKE DEVICE OF A VEHICLE

This application claims priority under 35 U.S.C. § 119 to application no. DE 10 2018 213 848.6, filed on Aug. 17, 2018 in Germany, the disclosure of which is incorporated herein by reference in its entirety.

TECHNICAL FIELD

The disclosure relates to a method for holding a vehicle in the stationary state, to an open-loop and closed-loop control device for a brake device of a vehicle, and to a brake device of a vehicle.

BACKGROUND

In order to park a vehicle with an automatic transmission, the P position of the gear selector lever is engaged. A parking lock (also referred to as a parking pawl) thereupon engages on a corresponding toothing arrangement on the transmission output. With this positive engagement the transmission is prevented from rotating if a torque acts on the wheels, and therefore on the drive train, owing to a downgrade force. In order to provide additional securement, it is known also to close a parking brake automatically or manually along with the engagement of the P position.

In the case of vehicles with a manual transmission, a gear, in particular the first gear or the reverse gear, is correspondingly engaged for the purpose of parking. Furthermore, a parking brake for additionally securing the vehicle is usually activated automatically or manually.

SUMMARY

The problem on which the disclosure is based is achieved by means of a method, an open-loop and closed-loop control device, and a brake device having the features of the disclosure. Advantageous developments are specified in the embodiments. Features which are important for the disclosure can also be found in the following description and in the drawings, wherein the features can be important for the disclosure alone and in different combinations without reference being made explicitly to them once more.

The disclosure therefore firstly includes a method for holding a vehicle in the stationary state. The method has the following steps here:
  a. if the vehicle has an automatic transmission: engaging a parking lock, or if the vehicle has a manual transmission: engaging a gear;
  b. at least temporarily: automatically carrying out vehicle movement monitoring by means of a sensing device;
  c. automatically activating a brake device of the vehicle in order to apply a braking force if the sensing device signals a vehicle movement.

In order to shut down the vehicle, in the case of a vehicle with an automatic transmission the P position of the gear selector lever (and therefore the parking lock) is therefore firstly engaged. Correspondingly, in the case of a vehicle with a manual transmission a gear, in particular the first gear or the reverse gear, is engaged. The further method steps are then carried out. If a vehicle movement is therefore sensed during the vehicle movement monitoring, the brake device is activated in such a way that a braking force is applied to the vehicle, so that the vehicle is returned to the stationary state and held in the stationary state. The vehicle movement monitoring can be carried out using a longitudinal acceleration sensor which can determine acceleration along the longitudinal direction of the vehicle. It would also be conceivable to perform monitoring additionally or alternatively using at least one wheel rotational speed sensor.

The disclosure is based here, in particular, on the realization that in a vehicle with an automatic transmission sufficient holding security can be made available by the parking lock if both wheels of the drive train which are supported on the parking lock are located on a road covering with a high coefficient of friction. In contrast, if one of the wheels is on a covering with a highly reduced coefficient of friction (for example on ice), the stationary state of the vehicle is no longer secured. The reason for this is that a drive shaft leads from the transmission output to a differential gear. There, the drive torque is distributed between both wheels. In the stationary state, the transmission and therefore the drive shaft is blocked by means of the parking lock. The input into the differential is therefore fixed. If the vehicle is then, for example, on a road with a positive gradient or a negative gradient, the downgrade force results in a torque on the wheels. If in this context both wheels apply a torque of similar magnitude to the differential, the vehicle is securely held in the stationary state by the locked drive shaft, wherein the differential can be, in particular, somewhat stressed. If, on the other hand, both wheels apply a different torque to the differential, the wheel with the relatively high torque, which is accordingly on an underlying surface with a relatively high coefficient of friction, even when the drive shaft is locked (the parking lock engaged), can drive the low-torque wheel which is on an underlying surface with a relatively low coefficient of friction. As a result, the vehicle can begin to move. Therefore, in particular in the case of an underlying surface which is smooth on one side, the holding capability is not ensured by the parking lock, so that the vehicle can be set in motion.

If a vehicle movement is detected, a braking force is then applied to the vehicle by means of the brake device, so that the vehicle is returned to the stationary state. Therefore, the brake device is not activated until it is also actually required. The brake device, in particular an actuator of the brake device, for applying a braking force is consequently not actuated until a braking force is actually required. Therefore, the energy consumption of the vehicle can be lowered. In a usual case, a vehicle is in fact often on a level or virtually level underlying surface, so that the braking force which is brought about by the parking lock and which acts on the vehicle is sufficient to secure the stationary state. Furthermore, a vehicle is usually at locations in which all the vehicle wheels are on an underlying surface with a high coefficient of friction. Finally, according to the disclosure the component loading can also be reduced in that the brake device is not activated or actuated until its braking force is also actually required.

In an analogous fashion, it is the case that for a parked vehicle with manual transmission (manual switch) a holding torque is applied by virtue of the fact that a gear is engaged and the holding torque is supported on the engine if the vehicle is parked. However, if a torque exceeds the holding torque owing, in particular, to an acting downgrade force, the vehicle can also begin to move here. According to the disclosure, in this context a braking force is also applied to the vehicle by means of the braking device when a vehicle movement is sensed, so that the vehicle is returned to the stationary state and is held in the stationary state.

In one preferred embodiment, before step b. an inclination variable, which represents an inclination of the vehicle, is additionally sensed or determined. In this context, the vehicle movement monitoring is carried out only if the sensed or determined inclination variable exceeds a limiting value. It can therefore firstly be checked whether the vehicle is on an inclined slope, specifically irrespective of whether the vehicle is positioned uphill or downhill. It can therefore be checked whether the sensed inclination variable exceeds a limiting value. The limiting value can be performed here, on the one hand, in such a way that the vehicle movement monitoring is carried out even if the vehicle inclination is zero, that is to say even if the vehicle is shut down on a slope. In particular, the limiting value can, however, be greater than zero, so that the vehicle movement monitoring is carried out only when the vehicle is shut down at a location which has a gradient between at least 3% and 8%, in particular between at least 4% and 6%, more particularly of at least 5%. The vehicle inclination can be sensed, for example, using a longitudinal acceleration sensor.

In a further refinement, step b. is not started until an ignition system of the vehicle is switched off. If an inclination variable which represents a vehicle inclination is sensed or determined before step b., there can, in particular, be provision that this sensing or determination is also not carried out until the ignition system is switched off. Therefore, in the case of an automatic transmission, step b. is, in particular, not started until the P position is engaged and the ignition system of the vehicle is switched off. In this context, there can be provision, in particular, that the vehicle driver is not allowed to remove the ignition key or to switch off the ignition system until the P position is engaged. In an analogous fashion, in the case of a manual transmission there can be provision that a vehicle driver cannot switch off the ignition system until a gear, in particular the first gear or the reverse gear, is engaged. This measure can ensure that after the switching off of the vehicle a holding torque is present and therefore the application of a braking force by means of the brake device of the vehicle can initially be dispensed with.

In a further refinement, the vehicle movement monitoring in step b. is carried out only until a time limit is reached. This time limit can be, for example, between 30 seconds and 5 minutes and be, in particular, at least 1 minute. During this run-on time there can therefore be provision, in particular, that even if the ignition system is switched off, the sensing device is activated. The sensing device can be part of the open-loop and closed-loop control device of the vehicle so that the open-loop and closed-loop control device can be activated in its entirety. The monitoring of the vehicle movement during the run-on can be carried out by means of the sensing device, and when a vehicle movement is detected the brake device can then be actuated in order to apply a braking force.

In this context it is, in particular, conceivable that the brake device comprises an electric parking brake, wherein in step c. an electrically generated braking force is applied to at least one vehicle wheel. The electric parking brake (also referred to as automatic parking brake, APB for short), is therefore in particular embodied in such a way that it can apply an electromechanically or electrohydraulically generated braking force to at least one vehicle wheel. The electric parking brake is not actuated here until the electrical braking force which is generated as a result is also actually required. Therefore, the energy consumption of the vehicle can be reduced overall by virtue of the fact that the actuation of an actuator, for example of an electric motor, of the electric parking brake does not take place until the electrically generated braking force is actually required. In addition, the component loading of the brake device can be reduced by this measure. The electric parking brake can, in particular, be embodied in a self-locking fashion, so that no further supply of energy is necessary after its actuation.

Alternatively it would also be conceivable that the brake device comprises a hydraulic service brake, wherein in step c. a hydraulically generated braking force is applied to at least one vehicle wheel, in particular to all the vehicle wheels.

In this context it is, however, in particular conceivable that the brake device comprises both an electric parking brake and a hydraulic service brake, wherein in step c. in addition to the electrically generated braking force a hydraulically generated braking force is also applied to at least one vehicle wheel. A hydraulic braking force can usually be applied at short notice as an electrical braking force. This is due to the fact that the idle times of a hydraulic service brake are comparatively short, while an electric parking brake must usually firstly overcome clearance before a braking force can be applied. It is conceivable here that the electric parking brake and the hydraulic service brake are completely independent of one another by virtue of the fact that they comprise respectively separate components. However, the implementation can also be effected by virtue of the fact that, for example, an electric motor of the electromechanical parking brake as well as other additionally necessary components, such as, for example a spindle-nut system, are integrated directly onto a brake caliper of the hydraulic service brake (so-called motor-on-caliper system). Such a system is usually implemented on the wheels of the rear axle of a vehicle. In this context, the electric parking brake and the hydraulic service brake use the same brake caliper, brake piston and the same brake disk or disks. In this case, the brake piston can consequently be moved either hydraulically or else electrically, in particular electromechanically or electrohydraulically.

Furthermore, it is conceivable that the hydraulic braking force is canceled if the electrically generated braking force has reached a target braking force. The attainment of the target braking force takes some time in the case of an electric parking brake, in particular since, as stated above, it is usually firstly necessary to overcome clearance before a braking force is applied to a wheel. In this time, the vehicle can be additionally secured by the hydraulic braking force. When the target braking force is reached, the hydraulic braking force can then be canceled.

In addition, there can be provision that in step b. rolling movement monitoring is additionally carried out until the time limit is reached, wherein the time limit is extended if the sensed rolling movement exceeds a limiting value. Rolling movements can, for example, also be detected here, as can the vehicle inclination, by means of a longitudinal acceleration sensor. The rolling movement is a movement about the longitudinal axis of the vehicle. Accordingly it is checked to what extent the vehicle is deflected from the position of rest about the longitudinal axis. This is based on the realization that the impulses occurring during a rolling movement can set the vehicle in motion on a smooth underlying surface. If rolling movements occur up to the time when the original time limit is reached, the time limit is extended. The extension can be, for example, between 10 seconds and 10 minutes. If rolling movements continue to occur during the extended time limit, there can be provision that the time limit is extended once more. In this context, the time limit of the rolling movement (deflection of the vehicle out of the position of rest about the longitudinal axis) can be zero or else, in particular, significantly greater than zero, so that not every sensed rolling movement causes the time limit to be extended.

It is also conceivable that in step b. fluctuations in the sensed inclination variable are additionally sensed until the time limit is reached, wherein the time limit is extended if the sensed fluctuations, that is to say in particular the sensed differences in the sensed inclination variable, exceed a limiting value. Such fluctuations in the sensed inclination variable can also occur as a result of rolling movements or, for example, also as a result of pulses occurring during the closing of the vehicle doors. The limiting value can also be zero here, but is preferably significantly greater than zero.

It is additionally proposed that step b. is carried out even if no inclination variable can be sensed or if the sensing quality of the sensed inclination variable undershoots a limiting value. Therefore, step b. is carried out even if gradient information of the vehicle is not available or if no clear gradient information (for example owing to excessive noise) is available.

In addition, the disclosure includes an open-loop and closed-loop control device for a brake device of a vehicle, having a processor and a memory. In this context, the open-loop and closed-loop control device is designed to execute the method according to the disclosure.

Finally, the disclosure includes a brake device for a vehicle. In this context, the brake device comprises an open-loop and closed-loop control device having a processor and a memory, wherein the open-loop and closed-loop control device is designed to execute the method according to the disclosure.

BRIEF DESCRIPTION OF THE DRAWINGS

Further features, application possibilities and advantages of the disclosure emerge from the following description of exemplary embodiments of the disclosure which are explained with reference to the drawing, in which:

FIG. 4 shows a flow chart of a method for holding a stationary vehicle which has a manual transmission.

DETAILED DESCRIPTION

Functional equivalent elements and regions have the same reference symbols in the following figures and are not explained in detail again.

Figure 1:
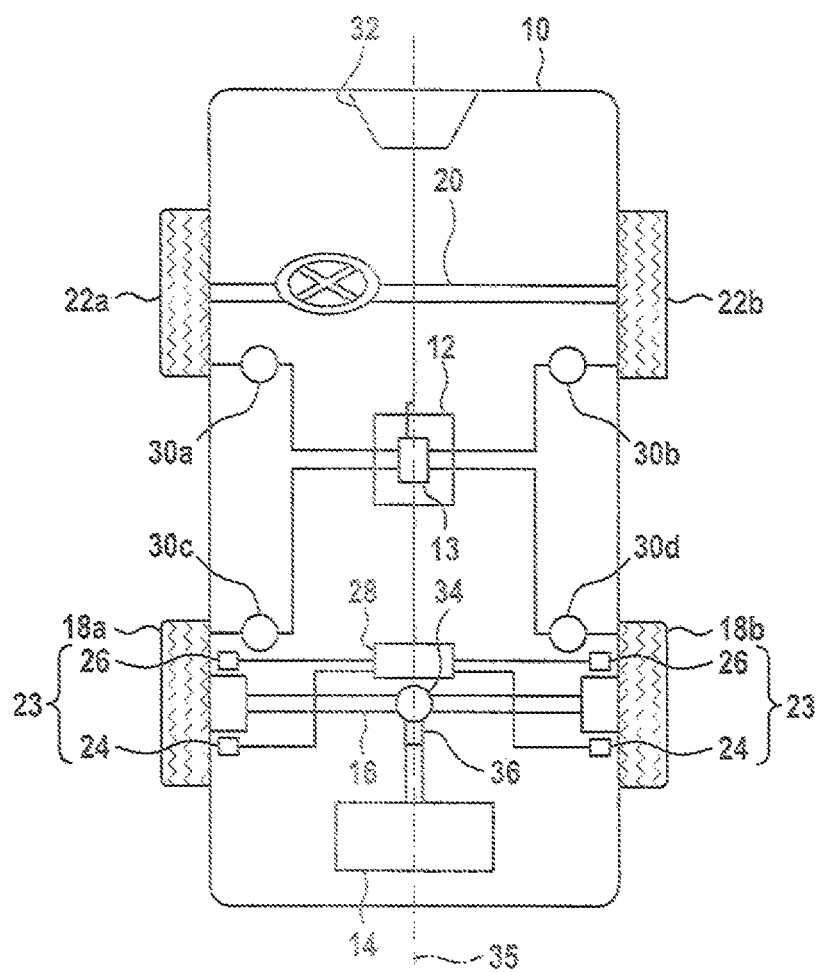
FIG. 1 shows a schematic plan view of a vehicle having a brake device.

FIG. 1 shows a vehicle 10 which comprises an open-loop and closed-loop control device 12 having a processor and a memory (both not illustrated). In order to drive the vehicle 10, the vehicle 10 has a drive 14, which, in the example illustrated in FIG. 1, acts on a rear axle 16 and therefore rear wheels 18*a*, 18*b* of the vehicle. The drive 14 can be, for example, an internal combustion engine and/or an electric motor. The vehicle also includes a non-driven front axle 20 with front wheels 22*a*, 22*b*.

In order to brake the vehicle 10, it has a brake device 23 with two brake devices 24, 26 which are independent of one another. In the normal driving mode of the vehicle 10, a service brake 24 is usually activated by means of a hydraulic system or by means of a brake pedal (not illustrated). The service brake 24 acts on all four wheels 18*a*, 18*b*, 22*a* and 22*b*, even though this is not illustrated in this way for reasons of simplification in FIG. 1. Moreover, the vehicle 10 has an electric parking brake (APB) 26 which acts on the rear wheels 18*a*, 18*b*. It would also be conceivable for the two brake devices not to be embodied independently but rather, for example, as a so-called motor-on-caliper system in which the service brake and the parking brake use the same brake caliper and brake piston and the same brake disks. It would also be conceivable for the service brake 24 and/or the parking brake 26 to act on all the wheels 18*a*, 18*b*, 22*a*, 22*b* of the vehicle 10 and not only on the rear axle 16, as illustrated in the figure. The parking brake 26 which is illustrated in FIG. 1 is activated electrically, in particular electromechanically, wherein the open-loop and closed-loop control device 12 has means 28 which can be used to actuate the parking brake 26. Depending on the embodiment, these means 28 can also be integrated into the open-loop and closed-loop control device 12. The service brake 24 can also be actuated using the means 28.

The vehicle 10 also includes wheel rotation speed sensors 30*a* to 30*d* which are assigned to the rear wheels 18*a*, 18*b* and to the front wheels 22*a*, 22*b* and can sense their rotational speed. In addition, the vehicle 10 comprises at least one longitudinal acceleration sensor 32. The open-loop and closed-loop control device 12 comprises a sensing device 13. The sensors 30*a* to 30*d* and 32 are connected to the sensing device 13.

The vehicle 10 comprises here an automatic transmission (not shown), a differential 34 and a parking lock 36. If the vehicle 10 is to be shut down, the P position is firstly engaged at the gear selector lever. As a result, the parking lock 36 engages with a corresponding toothing arrangement at a transmission output (not shown), so that the drive shaft is blocked and therefore the input into the differential 34 is fixed.

Figure 2:
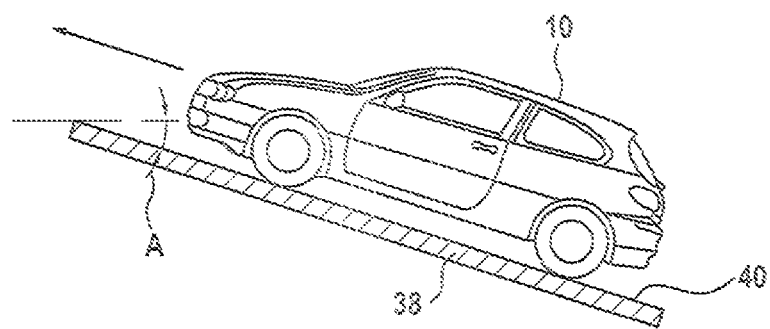
FIG. 2 shows a side view of the vehicle according to FIG. 1, which vehicle is parked in a car park with a gradient.
Figure 3:
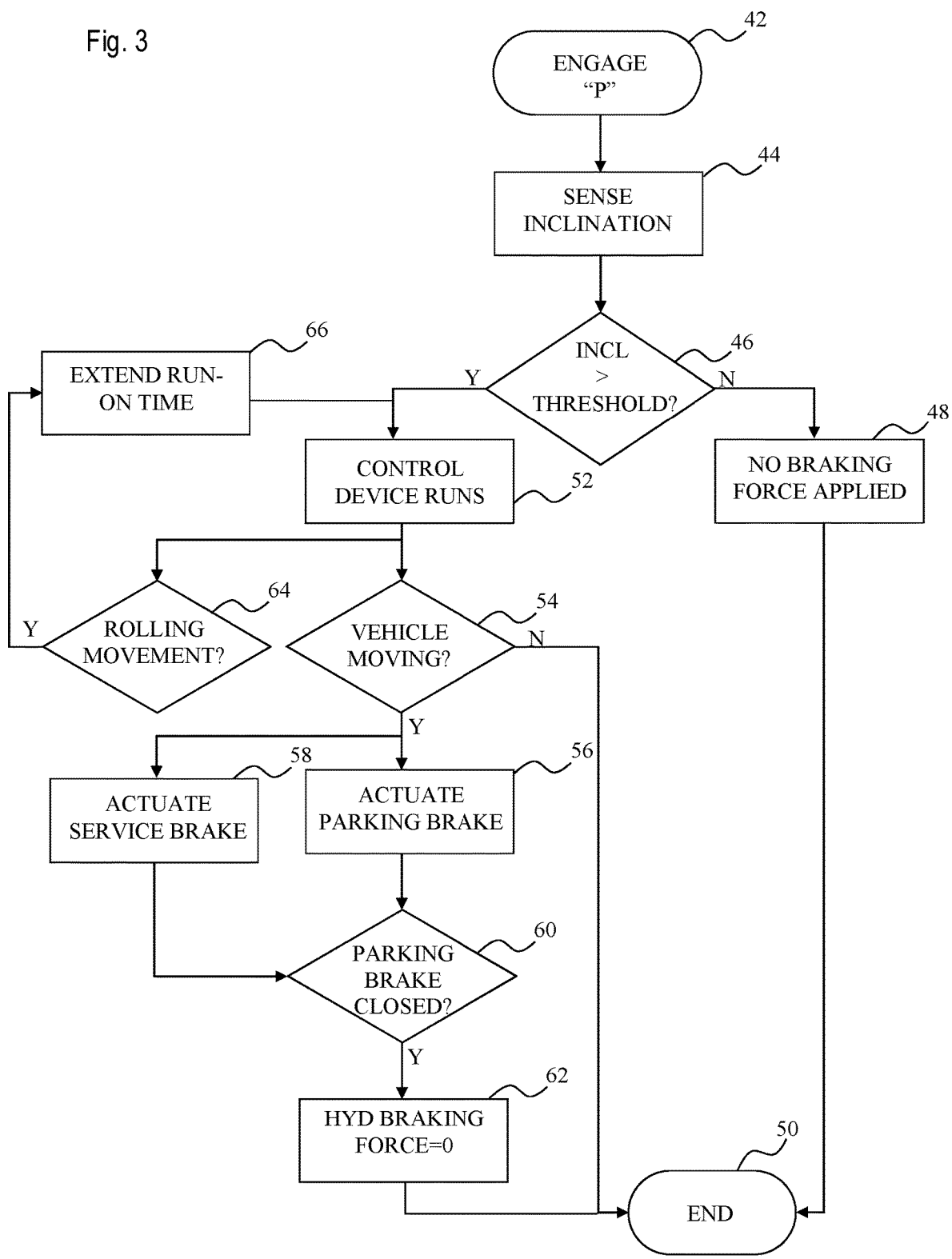
FIG. 3 shows a flow chart of a method for holding a stationary vehicle which has an automatic transmission.

In the state shown in FIG. 2, the vehicle 10 is parked on a road 38 with a gradient. The surface 40 of the road 38 includes an angle A with the horizontal. Correspondingly, the vehicle 10 also has a longitudinal inclination corresponding to the angle A. In order to keep the parked vehicle 10 in the stationary state, a corresponding method will now be explained with reference to FIG. 3:

In order to park the vehicle 10, for example, at the location shown in FIG. 2, the P position of the automatic gear shift of the vehicle 10 is firstly engaged in block 42. With the engagement of the P position, the parking lock 36 engages so that a holding torque is applied to the differential 34 in order to keep the vehicle 10 in the stationary state (cf. FIG. 1). Then, an inclination variable, which represents the vehicle inclination, is sensed in block 44. This can be done, for example, by means of the longitudinal acceleration sensor 32 (cf FIG. 1). It is conceivable that the process does not start with block 44 until it has also been sensed in block 42 that the ignition system has been switched off. However, block 44 can, in particular, be started as soon as the P position is engaged.

Then, in a block 46 it is checked whether the sensed inclination variable exceeds a limiting value. The limiting value can correspond, for example, to a roadway inclination of 5%. If the vehicle 10 is accordingly on an underlying surface with a gradient of less than 5%, the process continues with block 48 in which it is decided not to apply a braking force, since the holding torque which is applied to the vehicle 10 by the parking lock is sufficient to securely hold the vehicle 10 in the stationary state. Then, in block 50 the method is ended, wherein the open-loop and closed-loop control device 12 is switched off (if appropriate after a run-on of 10 seconds to 15 seconds).

If, in contrast, an inclination variable which corresponds to a roadway gradient of more than 5% is sensed in block 46, the process continues with block 52. In this block 52, it is initially decided that the open-loop and closed-loop control device 12 runs on for a time limit, that is to say is still active. The time limit can be, for example, one minute.

Then, in block 54 it is checked by means of the sensing device 13 whether the vehicle is moving, even though a holding torque is being applied to the vehicle 10 by means of the parking lock 36. This vehicle movement monitoring can be carried out using the rotational speed sensors 30a to 30d (cf. FIG. 1) and/or the longitudinal acceleration sensor 32. If in block 54 a vehicle movement is detected by the sensing device 13 and signaled, in block 56 the parking brake 26 is actuated by the open-loop and closed-loop control device 12 or the means 28 in order to apply an electrically generated braking force to the wheels 18a, 18b of the rear axle 16. In parallel with this, in a block 58 the service brake 24 is actuated by the open-loop and closed-loop control device 12 or the means 28, in order to apply a hydraulic braking force to the wheels 18a, 18b of the rear axle 16.

In a block 60 it is then checked whether the parking brake is completely closed, that is to say whether it generates its target braking force. If this is the case, in block 62 the hydraulic braking force is reduced to zero, and the method is ended in block 50. However, owing to the self locking of the parking brake 26 it remains closed, without a further supply of energy, for as long as the vehicle 10 is parked.

In parallel with block 54, in a block 64 it is checked by means of the longitudinal acceleration sensor 32 whether rolling movements are occurring. Rolling movements are in this context movements of the vehicle 10 about its longitudinal axis 35 (cf. FIG. 1). A rolling displacement corresponds here to a displacement of the vehicle 10 about its longitudinal axis 35 out of its position of rest by a certain amount. If this amount exceeds a limiting value, in block 66 the run-on time is extended. The extension can be, for example, 10 seconds or even up to 10 minutes. During this time, in block 54 vehicle movement monitoring is also carried out, and in block 64 it is also checked whether a rolling movement occurs. If appropriate, further extension of the run-on time occurs in block 66 if rolling movements continue to occur.

If the vehicle 10 is a vehicle which has a manual transmission instead of an automatic transmission, the method according to FIG. 4 is carried out. This method differs from the method according to FIG. 3 in that in a starting block 68 it is checked, when the vehicle 10 is shut down, whether a gear, in particular the first gear or the reverse gear, is engaged. In an additional step 70 it is checked whether the ignition system is also switched off. If both of these are true, the process continues with block 44. This block and all the further blocks 46 to 66 correspond to the procedure from FIG. 3.

Overall, according to the disclosure the energy consumption of the vehicle 10 can be reduced. Furthermore, the component loading of the vehicle 10 can be reduced. This has the following background: if the vehicle 10 is parked, a braking force is made available by means of the brake device 23 only if it is also actually required for securing the stationary state. This additional braking force is required here when the holding force which is made available by the parking lock 36 (or the holding torque of the transmission in the case of a manual transmission) is not sufficient to hold the vehicle 10 in the stationary state on a gradient. Therefore, the actuators (for example an electric motor of the parking brake 26) of the brake device 23 are actuated and activated only when the electrical braking force of the parking brake 26 is also actually required.

What is claimed is:

1. A method for holding a vehicle in a stationary state, the method comprising:

engaging one of (i) a parking lock if the vehicle has an automatic transmission and (ii) a gear if the vehicle has a manual transmission;

automatically monitoring, at least temporarily, movement of the vehicle using a sensing device after engaging the one of the parking lock and the gear; and automatically activating a brake device of the vehicle to apply a braking force in response to the sensing device signaling a vehicle movement during the monitoring, wherein the brake device includes an electric parking brake and a hydraulic service brake, the activating includes applying an electrically generated braking force to at least one vehicle wheel of the vehicle and applying a hydraulic braking force to at least one vehicle wheel of the vehicle, the method further comprising:

canceling the hydraulic braking force in response to the electrically generated braking force reaching a target braking force.

2. The method according to claim 1, further comprising, before the monitoring:

determining an inclination variable that represents an inclination of the vehicle, wherein the monitoring is performed only if the inclination variable exceeds a limiting value.

3. The method according to claim 1, wherein the monitoring is only performed after an ignition system of the vehicle is switched off.

4. The method according to claim 1, wherein the monitoring is performed only until a time limit is reached.

5. The method according to claim 4, the monitoring further comprising:

monitoring rolling movement of the vehicle until the time limit is reached; and extending the time limit in response to the rolling movement exceeding a limiting value.

6. The method according to claim 2, the monitoring further comprising:

sensing fluctuations in the inclination variable until a time limit is reached; and extending the time limit in response to the fluctuations exceeding a limiting value, wherein the monitoring movement of the vehicle is performed only until the time limit is reached.

7. The method according to claim 1, further comprising, before the monitoring:

using a second sensor device to sense an inclination variable that represents an inclination of the vehicle, wherein the monitoring is performed even if one of (i) no value for the inclination variable can be sensed and (ii) a sensing quality of the inclination variable undershoots a limiting value.

8. A control device, which is one of open-loop and closed-loop, for a brake device of a vehicle, the control device comprising:
  a memory; and
  a processor configured to:
    engage one of (i) a parking lock if the vehicle has an automatic transmission and (ii) a gear if the vehicle has a manual transmission;
    automatically monitor, at least temporarily, movement of the vehicle using a sensing device after engaging the one of the parking lock and the gear; and
    automatically activate a brake device of the vehicle to apply a braking force in response to the sensing device signaling a vehicle movement during the monitoring by applying an electrically generated braking force to at least one vehicle wheel of the vehicle and applying a hydraulic braking force to at least one vehicle wheel of the vehicle; and
    cancel the hydraulic braking force in response to the electrically generated braking force reaching a target braking force.

9. A brake device of a vehicle, the brake device comprising: a control device, which is one of open-loop and closed-loop, the control device comprising:
  a memory; and
  a processor configured to:
    engage one of (i) a parking lock if the vehicle has an automatic transmission and (ii) a gear if the vehicle has a manual transmission;
    determine an inclination variable that represents an inclination of the vehicle;
    automatically monitor, at least temporarily, movement of the vehicle using a sensing device after engaging the one of the parking lot and the gear; and
    automatically activate a brake device of the vehicle to apply a braking force in response to the sensing device signaling a vehicle movement during the monitoring,
  wherein:
    the monitoring is performed only if the inclination variable exceeds a limiting value, the monitoring further comprises
    sensing fluctuations in the inclination variable until a time limit is reached, and
    extending the time limit in response to the fluctuations exceeding a limiting value; and
    the monitoring movement of the vehicle is performed only until the time limit is reached.

* * * * *